US005504604A

United States Patent [19]

Takatori et al.

[11] Patent Number: 5,504,604
[45] Date of Patent: Apr. 2, 1996

[54] LIQUID CRYSTAL DISPLAY ELEMENTS WITH OPPOSITE TWIST DOMAINS ALIGNED IN THE SAME DIRECTION ON ONE SUBSTRATE

[75] Inventors: Ken-Ichi Takatori; Yoshihiko Hirai; Ken Sumiyoshi, all of Tokyo, Japan

[73] Assignee: NEC Corporation, Tokyo, Japan

[21] Appl. No.: 287,792

[22] Filed: Aug. 9, 1994

Related U.S. Application Data

[63] Continuation of Ser. No. 7,960, Jan. 22, 1993, abandoned.

[30] Foreign Application Priority Data

Jan. 22, 1992 [JP] Japan .................. 4-008835
Jan. 27, 1992 [JP] Japan .................. 4-011547
Feb. 17, 1992 [JP] Japan .................. 4-028724
Feb. 20, 1992 [JP] Japan .................. 4-033336
Feb. 21, 1992 [JP] Japan .................. 4-034844

[51] Int. Cl.$^6$ ............................ G02F 1/1337
[52] U.S. Cl. .................. 359/75; 359/78; 359/102
[58] Field of Search ............. 359/75, 76, 77, 359/78, 79, 102, 63

[56] References Cited

U.S. PATENT DOCUMENTS

| | | | |
|---|---|---|---|
| 4,333,708 | 6/1982 | Boyd et al. ................ | 359/75 |
| 4,521,080 | 6/1985 | Funada et al. ............. | 359/76 |
| 5,249,070 | 9/1993 | Takano ...................... | 359/102 |
| 5,280,375 | 1/1994 | Tsuda et al. ............... | 359/78 |
| 5,309,264 | 5/1994 | Lien et al. ................. | 359/77 |

FOREIGN PATENT DOCUMENTS

| | | | |
|---|---|---|---|
| 2525979 | 11/1978 | Germany ................. | 359/78 |
| 58-031318 | 2/1983 | Japan . | |
| 59-204823 | 11/1984 | Japan ..................... | 359/76 |
| 59-211019 | 11/1984 | Japan ..................... | 359/76 |
| 60-159725 | 8/1985 | Japan . | |
| 60-222824 | 11/1985 | Japan . | |
| 61-51125 | 3/1986 | Japan ..................... | 359/76 |
| 0106624 | 5/1988 | Japan . | |
| 4204818 | 7/1992 | Japan ..................... | 359/76 |

OTHER PUBLICATIONS

IBM Technol Disclosure Bulletin, vol. 33 #1B, Jun. 1990 pp. 199–200.

*Primary Examiner*—William L. Sikes
*Assistant Examiner*—Kenneth Parker
*Attorney, Agent, or Firm*—Sughrue, Mion, Zinn, Macpeak & Seas

[57] ABSTRACT

A liquid crystal display element including a first supporting substrate having a first orienting film for controlling liquid crystal molecules so that the molecules in adjacent orienting domains out of a plurality of orienting domains that are formed by dividing one display unit are oriented in directions that make an angle of 180° with each other, a second supporting substrate having a second orienting film, and facing the first supporting substrate for controlling liquid crystal molecules so that the molecules are oriented in directions that make an angle of 90° with the direction of orientation provided by the first orienting film, and setting a pretilt angle given to the molecules by the first orienting film at a value that is equal to or larger than that given to the molecules by the second orienting film. The second supporting substrate has the alignment in both regions in the same direction.

14 Claims, 20 Drawing Sheets

FIG. 22A

| PX | A | B | A | B | A |
|---|---|---|---|---|---|
|  | B | A | B | A | B |
|  | A | B | A | B | A |

FIG. 22B

| PX | A | A | B | B | A |
|---|---|---|---|---|---|
|  | B | B | A | A | B |
|  | A | A | B | B | A |

FIG. 23A

| R<br>(A) | G<br>(B) | B<br>(A) | R<br>(B) | G<br>(A) | B<br>(B) |
|---|---|---|---|---|---|
| R<br>(B) | G<br>(A) | B<br>(B) | R<br>(A) | G<br>(B) | B<br>(A) |
| R<br>(A) | G<br>(B) | B<br>(A) | R<br>(B) | G<br>(A) | B<br>(B) |

FIG. 23B

| R<br>(A) | G<br>(B) | B<br>(A) | R<br>(B) | G<br>(A) | B<br>(B) |
|---|---|---|---|---|---|
| B<br>(B) | R<br>(A) | G<br>(B) | B<br>(A) | R<br>(B) | G<br>(A) |
| G<br>(A) | B<br>(B) | R<br>(A) | G<br>(B) | B<br>(A) | R<br>(B) |

FIG. 23C

| R<br>(A) | G<br>(B) | B<br>(A) | R<br>(B) | G<br>(A) | B<br>(B) |
|---|---|---|---|---|---|
| B<br>(B) | R<br>(A) | G<br>(B) | B<br>(A) | R<br>(B) | |
| R<br>(B) | G<br>(A) | B<br>(B) | R<br>(A) | G<br>(B) | B<br>(A) |

FIG. 24A

| R (A) | G (A) | B (B) | R (B) | G (A) | B (A) |
|---|---|---|---|---|---|
| R (B) | G (B) | B (A) | R (A) | G (B) | B (B) |
| R (A) | G (A) | B (B) | R (B) | G (A) | B (A) |

FIG. 24B

| R (A) | G (A) | B (B) | R (B) | G (A) | B (A) |
|---|---|---|---|---|---|
| B (B) | R (B) | G (A) | B (A) | R (B) | G (B) |
| G (A) | B (A) | R (B) | G (B) | B (A) | R (A) |

FIG. 24C

| R (A) | G (A) | B (B) | R (B) | G (A) | B (A) | |
|---|---|---|---|---|---|---|
| | B (B) | R (B) | G (A) | B (A) | R (B) | G (B) |
| R (B) | G (B) | B (A) | R (A) | G (B) | B (B) | |

LIQUID CRYSTAL DISPLAY ELEMENTS WITH OPPOSITE TWIST DOMAINS ALIGNED IN THE SAME DIRECTION ON ONE SUBSTRATE

This is a Continuation of Application Ser. No. 08/007,960 filed Jan. 22, 1993 now abandoned.

FIELD OF THE INVENTION

This invention relates to a liquid crystal display element and a method for manufacturing thereof, wherein one display unit is divided into a plurality of domains and provided with a function to control the orientation of liquid crystal molecules so that the molecules in adjacent domains out of the plurality of domains are oriented in directions that make an angle of 180° with each other whereby a wide field of vision can be assured.

BACKGROUND OF THE INVENTION

As illustrated in FIG. 1, the liquid crystal cell of the TN (twisted nematic) type is widely used for a liquid crystal display, such as liquid crystal TVs and liquid crystal displays used for computer systems. The cell consists of two substrates 1, 2, which are made of transparent materials such as glass, a layer 3 of nematic liquid crystal, which is made of positively and dielectrically anisotropic nematic liquid crystals, and which is sandwiched between the substrates, and orienting films 4, 5, which are disposed between the substrates 1, 2 and the nematic liquid crystal layer 3 for controlling the orientation of liquid crystal molecules LC. In this case, as shown by cigarette-like models, the directions of oblong liquid crystal molecules LC in the nematic liquid crystal layer 3 is twisted by 90° C.

Polarizing plates 6, 7 are provided on the outsides of the substrates 1, 2. The polarizing plate 6 which is put on the substrate 1, on which light is incident, is disposed such that the direction of the polarized light therethrough is parallel with the direction of a liquid crystal molecule LC that is in the nearest position to the substrate 1. The polarizing plate 7 that is put on the substrate 2, from which the refracted light is emitted, is disposed such that the direction of the polarized light therethrough is perpendicular to that of the light polarized by the polarizing plate 6.

When no electric voltage is applied across the substrates 1, 2, the oriented direction of the liquid crystal molecules LC in the nematic liquid crystal layer 3 remains in a state twisted by 90° between the substrates 1, 2, as shown in FIG. 1. Hence, the light incident on polarizing plate 6 travels along the twisted molecules LC in the layer 3. Then the light emitted from substrate 2, which is parallel with the direction polarized by polarizing plate 7, is transmitted through polarized plate 7. As a result, the cell of the TN type is in a bright state when there is no electric voltage is applied across the substrates 1, 2.

On the other hand, when an electric voltage is applied across the substrates 1, 2, the dielectric anisotropy of the molecules LC causes them to be disposed in a raised state along the direction of the electric voltage applied at that time. In this regard, the molecules LC which are located near to the substrates 1, 2 and more strongly restrained by the orienting films 4, 5, are affected to a lesser degree by the electric voltage applied.

When the amount of the voltage applied across the substrates 1, 2 becomes sufficient, the direction of substantially all the molecules LC becomes parallel with that of the voltage. At this time, the light incident on the polarized plate 6 passes through the nematic liquid crystal layer 3 in a polarized state as it is. As a result, the emitted light from substrate 2, which is polarized so that its direction is perpendicular to the polarized direction of the polarizing plate 7 on the emitting side, is not transmitted through polarizing plate 7. Accordingly, the cell of the TN type is in a dark state when there is an electric voltage between the substrates 1, 2.

A liquid crystal cell of the TN type which is in a bright state when no voltage is applied, and which is in a dark state when a voltage is applied, is called a normally-white-mode cell. On the contrary, a cell of the TN type, which is in a dark state when no voltage is applied and which is in a bright state when a voltage is applied, is called a normally-black-mode cell. This normally-black-mode cell is obtained by setting the polarized direction of the polarizing plate on the emitting side parallel with that of the polarizing plate on the incident side.

When the value of a voltage applied across the substrates 1, 2 is set at a medium value, namely, a certain value between the maximum value at which the TN-type cell is in a perfectly bright state (its transmittance is 100%) and the minimum value at which it is in a perfectly dark state (its transmittance is 0%), the transmittance of the TN-type cell can be set at a medium value to present any medium degrees of brightness (density).

However, if the TN-type liquid crystal cell is driven by using a medium degree of brightness, the brightness may change according to the direction of light passing through the cell so that the contents displayed differ, as shown in FIG. 2. Namely, the contents of the TN-type cell viewed from its front may differ from those viewed from its sides. This phenomenon is called its dependency on the optic angle. As shown in FIG. 1, the angle of θ indicates an angle made by light LL with the line Z normal to the substrate 2 of the TN-type cell.

In an attempt to alleviate the dependency of the TN-type cell on the optic angle, for example, Japanese Patent Early Publication No. 63-106624 discloses a method of manufacturing a cell of such type. A partial plan view of the liquid crystal display element manufactured by the method is shown in FIG. 3, and its cross-sectional view is shown in FIG. 4.

Referring to FIGS. 3 and 4, a liquid crystal display element consists of numbers of pixels, each display unit of which has a given dimension (for example, a square of 200 μm). They are disposed in a plane in given spaces. This liquid crystal display element consists of a liquid crystal material 12 sealed between glass substrates 10, 11 facing each other. Each of the substrates 10, 11 has transparent electrodes 13, 14 for defining the shape of each pixel PX and orienting films 15, 16 for orienting liquid crystal molecules LC. The transparent electrode 13, 14 and the orienting film 15, 16 are laminated in order on their respective substrate. A film-type transistor 17 for driving transparent electrode 13, which controls each pixel, is mounted on glass substrate 10.

Each pixel is vertically partitioned at its center by a transparent spacer 18. The parts partitioned by adjacent transparent spacers 18 define domains $DM_1$ and $DM_2$ disposed by turns.

These domains $DM_1$ and $DM_2$ are formed as shown in FIG. 5. That is, regarding orienting film 15 on the glass substrate 10, the domain $DM_1$ is rubbed in the rightward direction and the domain $DM_2$ is rubbed in the leftward direction. Regarding the orienting film 16 on glass substrate 11, the domain $DM_1$ is rubbed in the upward direction and the domain $DM_2$ is rubbed in the downward direction.

As the direction of the orientation of a liquid crystal molecule LC follows the direction along which the orienting film is rubbed, the molecule LC in the domain $DM_2$ has a pretilt angle different from that in the domain $DM_2$. Further, in this case, as the same liquid crystal is sealed in both the domains $DM_1$ and $DM_2$, the directions of spiraling of the spiraled liquid crystal molecules LC in both the domains $DM_1$ and $DM_2$ are the same.

Thus, the dependency on the optic angle, which is encountered when the TN-type cell is driven by using a medium degree of brightness, can be alleviated, as shown in FIG. 6, by dividing one unit pixel PX into domains $DM_1$ and $DM_2$, and by differing the directions of the pretilt angles of the molecules LC in domain $DM_1$ from those in domain $DM_2$. The TN-type liquid crystal cell of such structure is hereinafter called a complementary-type TN liquid crystal cell.

When manufacturing such a complementary-type cell, the following seven processes are needed to form the orienting films 15, 16 on their respective glass substrates 10, 11: coating a substrate with an orienting film material (step 1), masking domain $DM_2$ (step 2), rubbing domain $DM_1$ (step 3), exfoliating the mask covering domain $DM_2$ (step 4), masking domain $DM_1$ (step 5), rubbing domain $DM_2$ (step 6), and exfoliating mask covering domain $DM_1$ (step 7).

These processes cause a disadvantage in that the cost of manufacturing a complementary-type TN liquid crystal cell is increased.

SUMMARY OF THE INVENTION

In its first aspect this invention provides a liquid crystal display element including a first supporting substrate having a first orienting film for controlling liquid crystal molecules so that the molecules in adjacent orienting domains out of a plurality of orienting domains that are formed by dividing one display unit are oriented in directions that make an angle of 180° with each other, a second supporting substrate having a second orienting film, and facing the first supporting substrate for controlling liquid crystal molecules so that the molecules are oriented in the directions that make an angle of 90° with the direction of orientation provided by the first orienting film, and setting a pretilt angle given to the molecules by the first orienting film at a value that is equal to or larger than that given to the molecules by the second orienting film.

In the apparatus, liquid crystal molecules in a liquid crystal layer that are sealed between the first and second supporting substrates are strongly affected by those which are provided with larger pretilt angles. Hence, when an electric voltage is applied across the first and second supporting substrates, all the molecules in the layer are moved in the same direction as those molecules whose direction of orientation is defined by the first orienting film.

As a result, two different orienting domains are obtained by rubbing in one direction the second orienting film provided on the second supporting substrate. The process of manufacturing the second supporting substrate can thus be made simple.

A second aspect of this invention, which relates to a method for manufacturing the liquid crystal display unit of claim 1, provides the method comprising coating a first supporting substrate with a first orienting film, rubbing, in a first direction, one of adjacent orienting domains out of a plurality of orienting domains that are formed in the first orienting film on the first supporting substrate, rubbing, in a second direction that makes an angle of 180° with the first rubbing direction, the other adjacent orienting domain out of the plurality of orienting domains that are formed in the first orienting film on the first supporting substrate, coating a second supporting substrate that is disposed to face the first supporting substrate with a second orienting film, uniformly rubbing, in a direction making an angle of 90° with the first and second directions, the second orienting film of the second supporting substrate, and setting a first pretilt angle, which is given to liquid crystal molecules in the second and third rubbing steps that are applied to the first orienting film, at a value that is equal to or larger than a second pretilt angle given to the molecules in the fifth rubbing step that is applied to the second orienting film.

Thus, the number of steps in the process of manufacturing the liquid crystal display element of the invention can be reduced so that the cost of manufacturing the element can be reduced.

In a third aspect of this invention, which modifies the liquid crystal element of claim 1, a liquid crystal element is provided wherein the directions along which liquid crystal molecules are oriented by the first orienting film, and which make an angle of 180° with each other, are provided by processing the first orienting film along a line that extends from a position at which the display unit is divided to the boundary thereof.

In this element, when an electric voltage is applied across the first and second supporting substrates, the discontinuous part (a disclination) of the liquid crystal layer, at which two adjacent domains contact each other can be disposed at the center of the display unit.

As a result, the area of the disclination can be reduced so that a liquid crystal display unit with excellent contrast can be obtained.

In a fourth aspect this invention provides a liquid crystal element having a number of display pixels that are disposed in given spaces including a first supporting substrate having a first orienting film for controlling liquid crystal molecules so that the molecules in two adjacent display pixels that constitute one display unit are oriented in directions that make an angle of 180° with each other, a second supporting substrate having a second orienting film and facing the first supporting substrate for controlling liquid crystal molecules so that the molecules are oriented in directions that make an angle of 90° with the direction of orientation provided by the first orienting film, and setting a pretilt angle given to the molecules by the first orienting film at a value that is equal to or larger than that given to the molecules by the second orienting film.

Hence, the number of steps in the process of manufacturing a liquid crystal display element, even when a plurality of display pixels are treated as one display unit, can be reduced.

In a fifth aspect this invention provides a liquid crystal display element having a number of display pixels that are disposed in given spaces and a plurality of color filters of a given repetitive mode and of given kinds for each pixel including a first supporting substrate having a first orienting film for controlling liquid crystal molecules so that the molecules in adjacent orienting domains out of a plurality of orienting domains that are formed by dividing one display unit are oriented in directions that make an angle of 180° with each other, a second supporting substrate having a second orienting film, and facing the first supporting substrate for controlling liquid crystal molecules so that the molecules are oriented in the directions that make an angle of 90° with the direction of orientation provided by the first orienting film, and setting a pretilt angle given to the molecules by the first orienting film at a value that is equal to or larger than that given to the molecules by the second orienting film.

Hence, the number of steps in the process of manufacturing a liquid crystal element capable of color display can be reduced to provide a cheap color display means.

A aspect of this invention, which modifies the liquid crystal element of claim 1, provides the element wherein the first supporting substrate is provided with a capacitance provider for securing a required accumulation of capacity in conformity with the adjacent orienting domains out of the plurality of orienting domains.

Hence, as the disclination formed at the boundary between orienting domains is shaded by the capacitance provider, it is not necessary to provide a specific shading film.

BRIEF DESCRIPTION OF THE DRAWINGS

FIGS. 22A and 22B are schematic plan views for explaining a still another embodiment of the liquid crystal display element of this invention.

FIGS. 23A–23C are schematic plan view for explaining the adaptation of the embodiment shown in FIG. 22 for one capable of color display.

FIGS. 24A–24C are modifications of those shown in FIGS. 23A–23C.

DETAILED DESCRIPTION OF THE INVENTION

Figure 1:
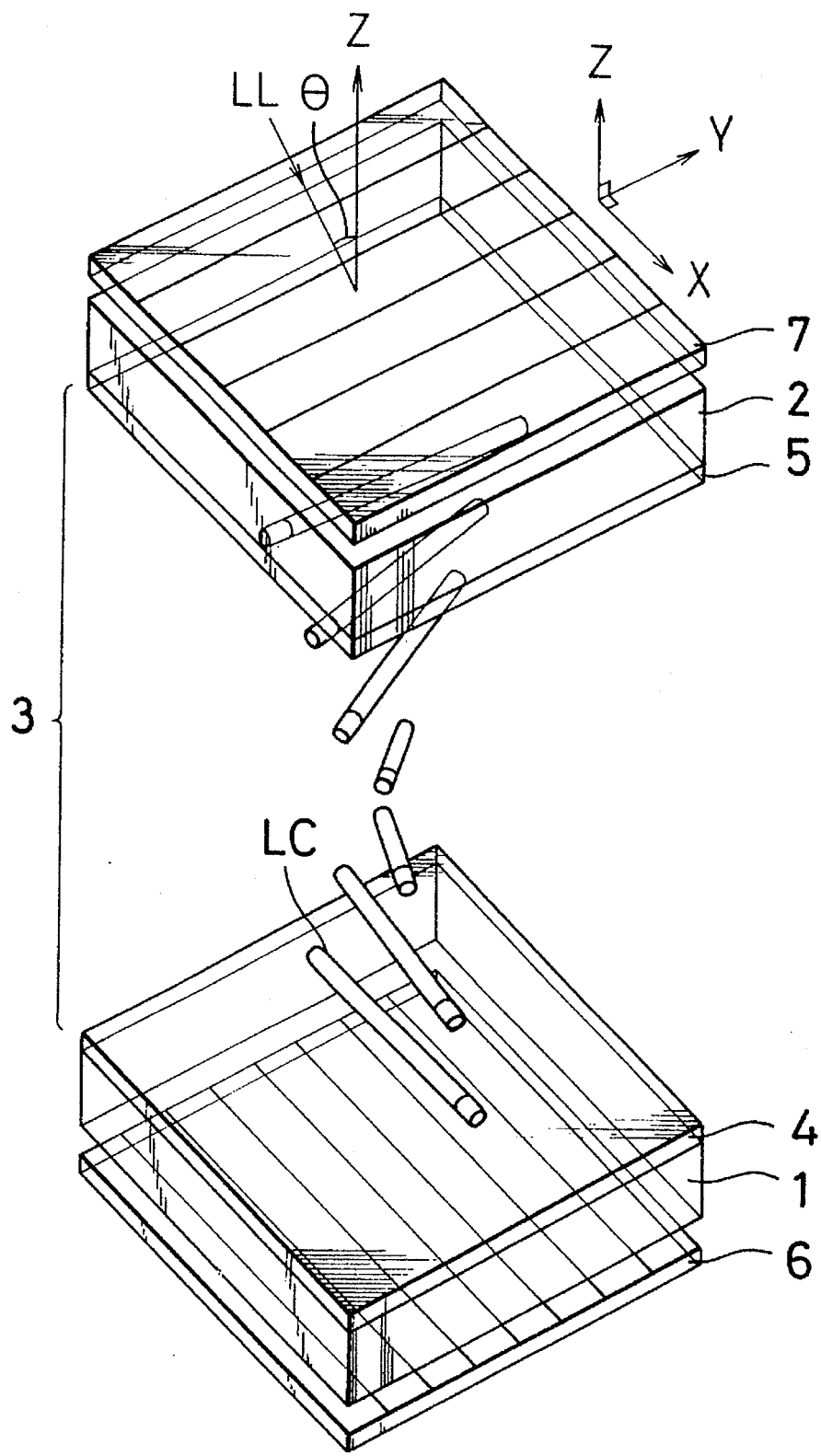
FIG. 1 is a sketch showing the fundamental constitution of a TN-type liquid crystal cell.
Figure 2:
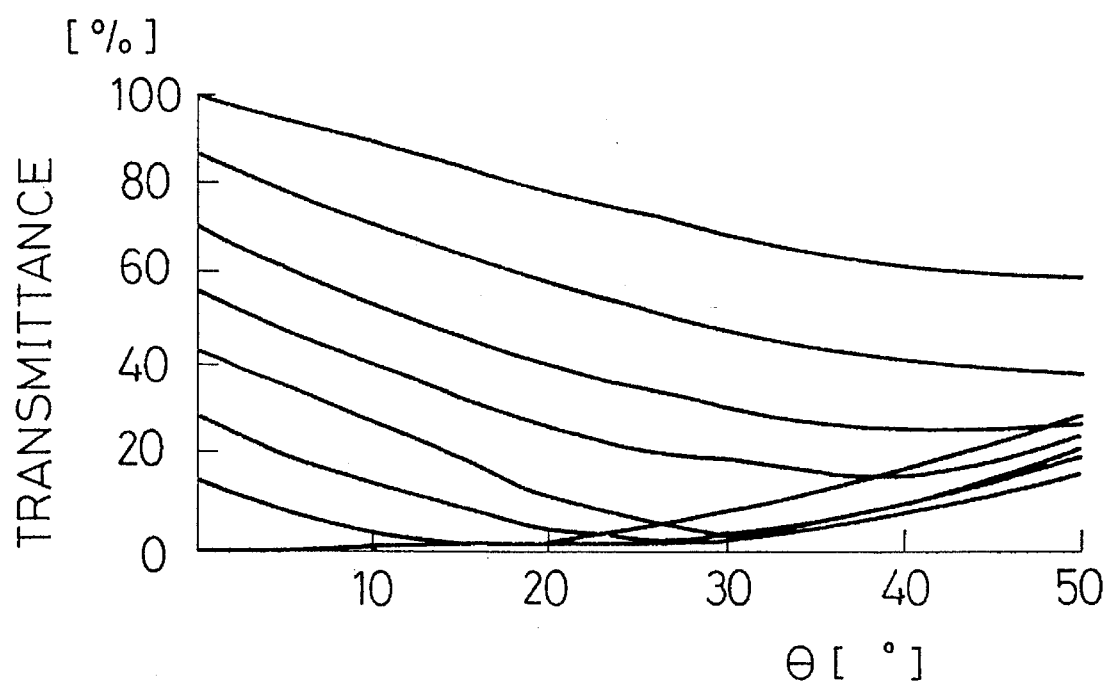
FIG. 2 is a graph for explaining the dependency on the optical angle of the cell shown in FIG. 1.
Figure 3:
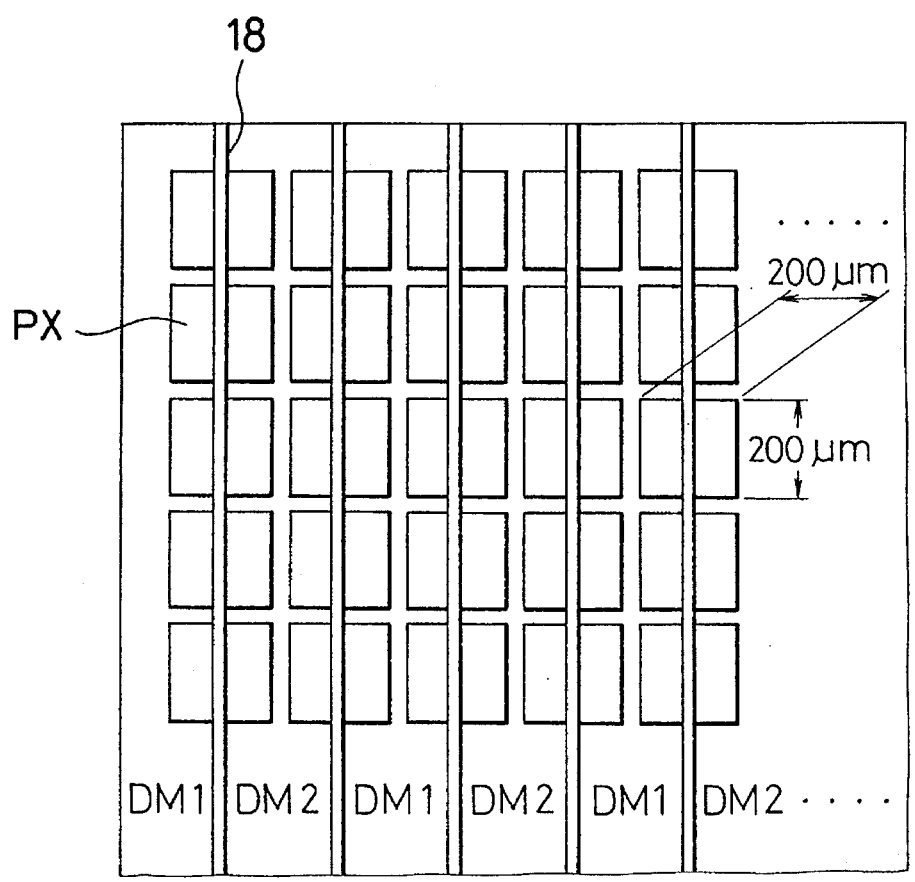
FIGS. 3, 4, and 5 are a plan view, a cross-sectional view, and a perspective view, respectively, for explaining the constitution of an improved prior-art complementary-type TN liquid crystal cell.
Figure 4:
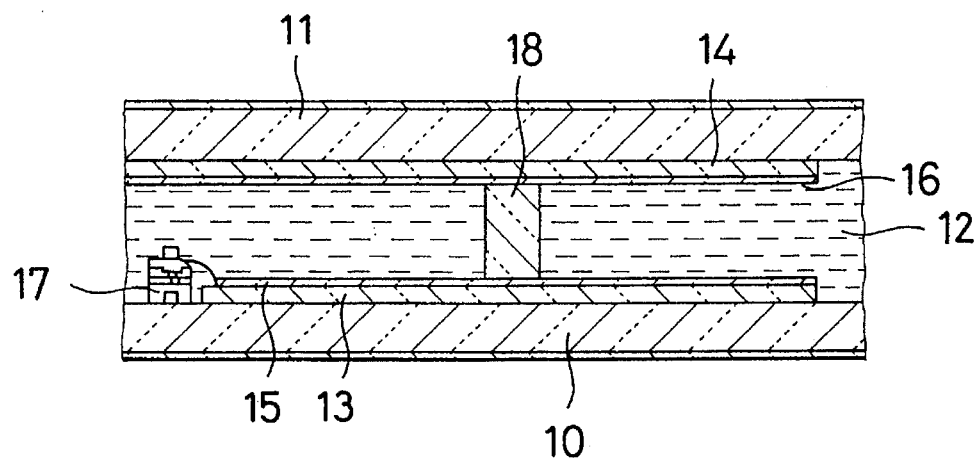
Figure 5:
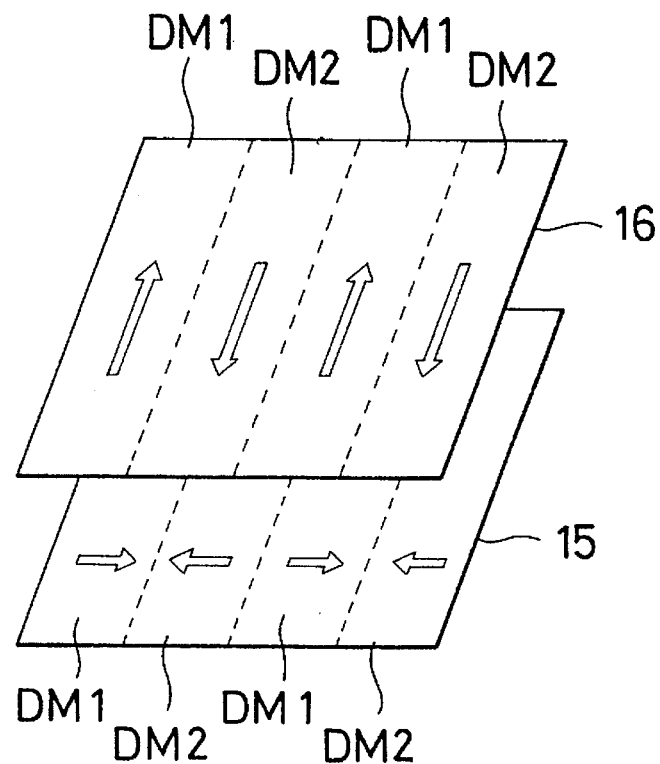
Figure 6:
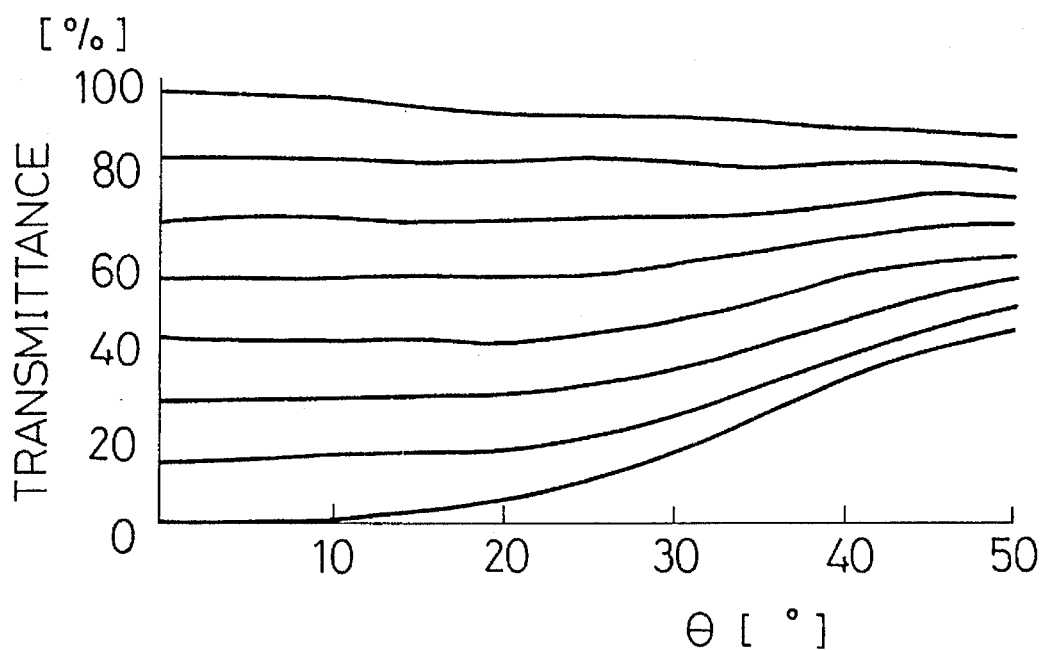
FIG. 6 is a graph for explaining the improved dependency on the optical angle of the cell shown in FIG. 1.
Figure 7:
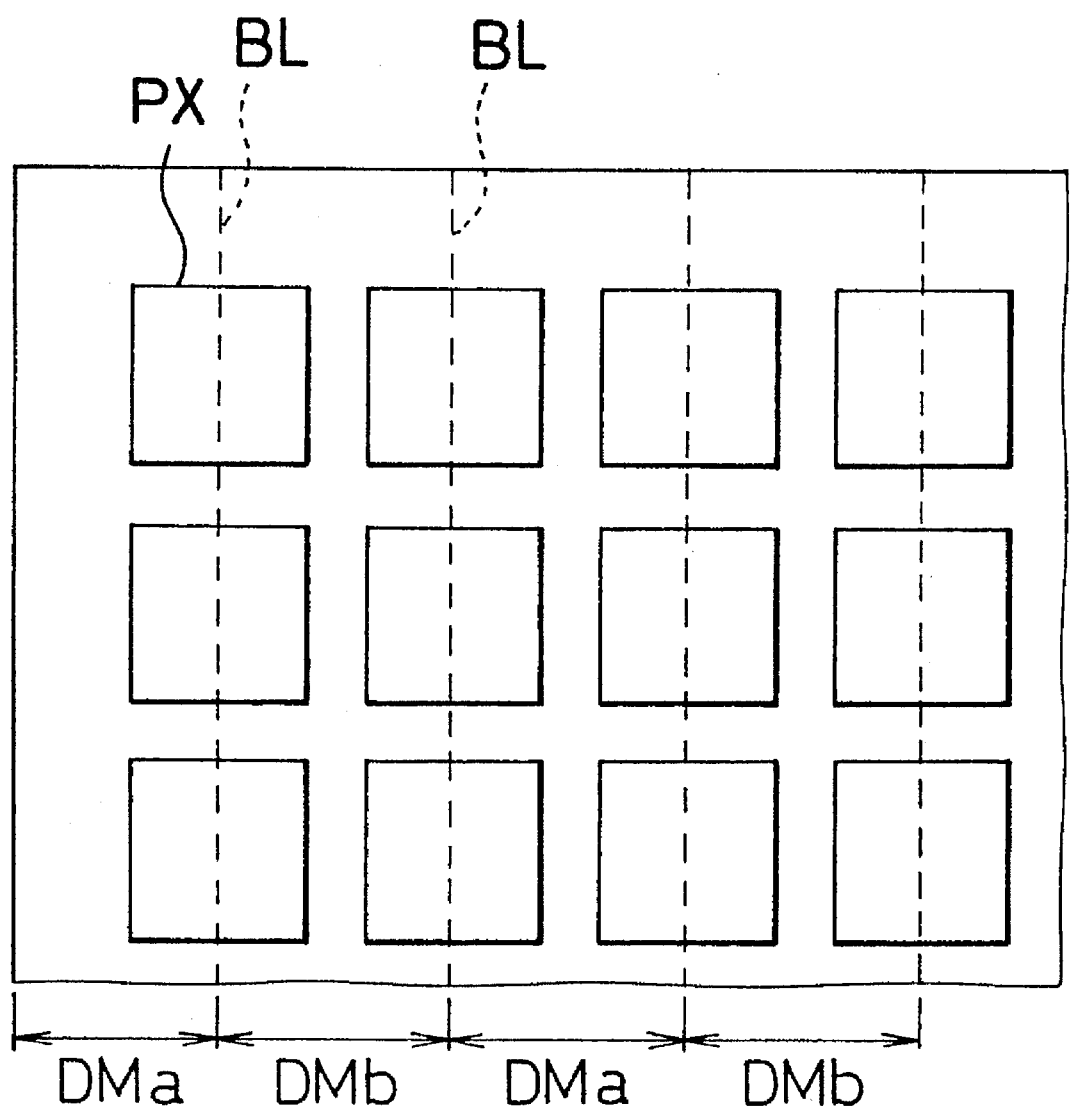
FIGS. 7 and 8A and 8B are schematic plan view and schematic cross-sectional views, respectively, for explaining an embodiment of this invention.
Figure 8A:
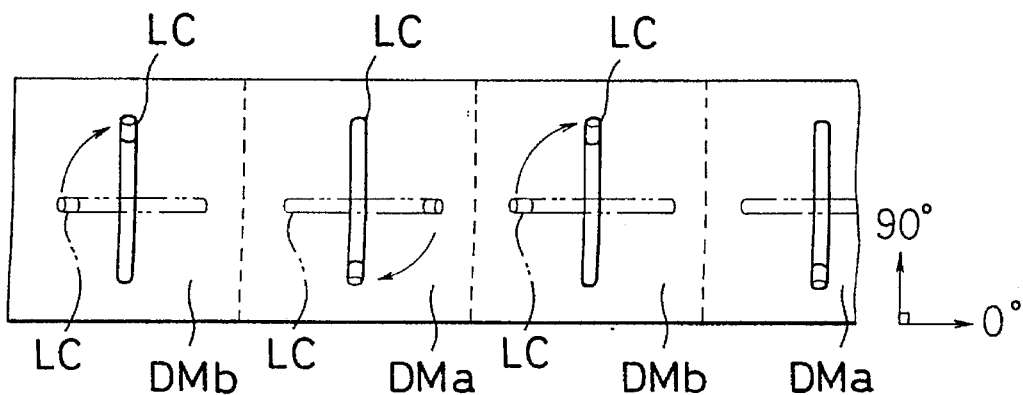
Figure 8B:
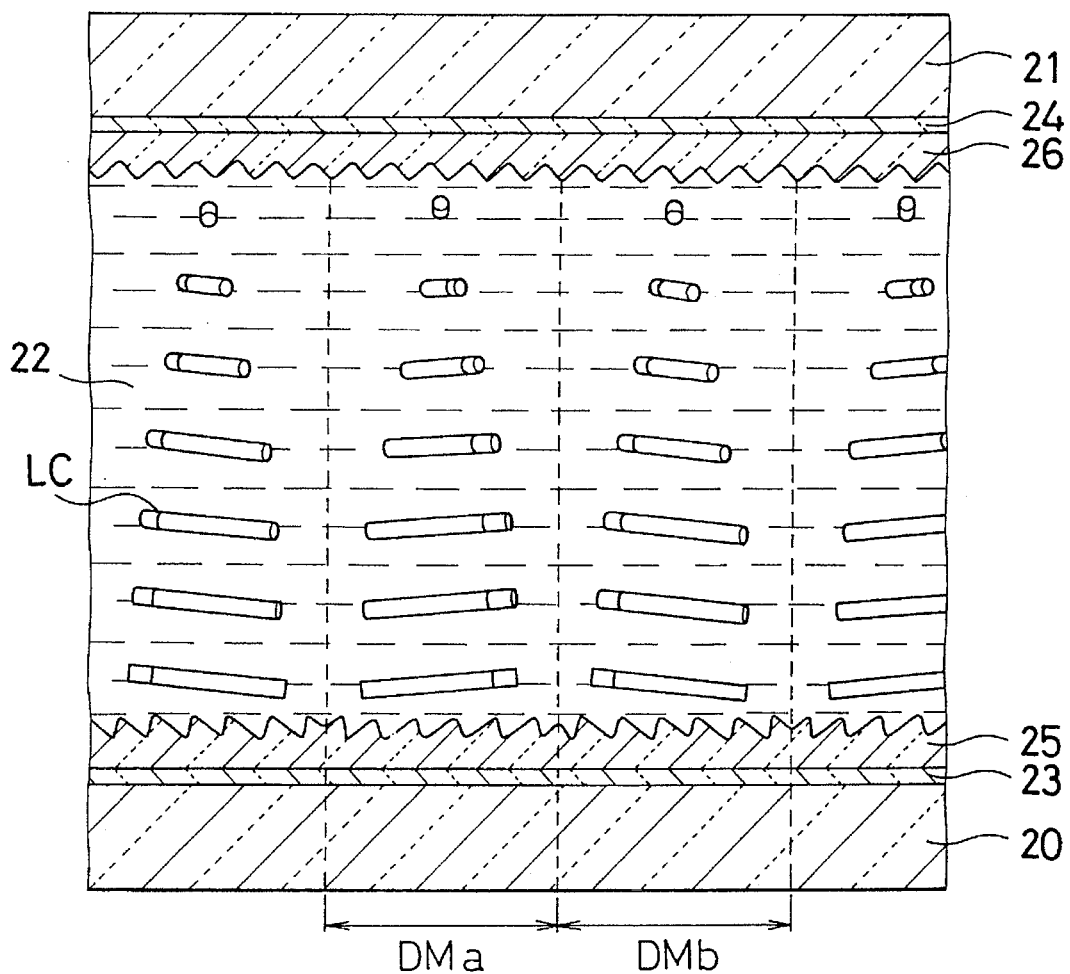

As shown in FIGS. 7, 8a, and 8b, an embodiment of a TN-type liquid crystal cell consists of numbers of pixels PX, each display unit of which cell has a given dimension (for example a square of 200 μm). These pixels are disposed in a plane in given spaces. The liquid crystal display element consists of a liquid crystal material 22 which is sealed between opposing glass substrates 20, 21. Each of the substrates 20, 21 has a transparent electrode 23, 24 for defining the shape of each pixel PX and an orienting film 25, 26 for orienting liquid crystal molecules LC. The transparent electrode 23, 24 and the orienting film 25, 26 are laminated in order on their respective substrate 20, 21.

Each pixel PX is divided at its center by a vertical line. This divisional position is indicated by a boundary line BL. The parts divided by two adjacent boundary lines BL define orienting domains DMa and DMb disposed by turns.

Regarding orienting film 25 on substrate 20, orienting domain DMa is rubbed in the rightward direction toward the boundary line BL, and domain DMb is rubbed in the leftward direction toward the boundary line BL. At the same time that orienting film 25 is rubbed, orienting film 26 on substrate 21 is rubbed in the direction of 90°.

Figure 9:
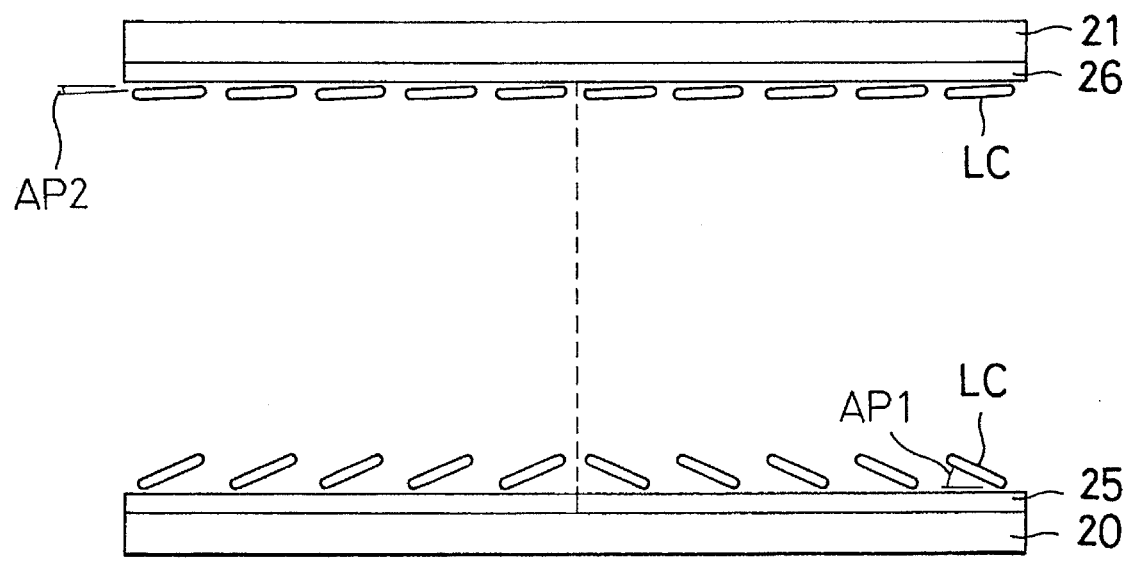
FIG. 9 is a sketch for explaining the pretilt angle given to the liquid crystal molecules LC by the orienting film.
Figure 10A:
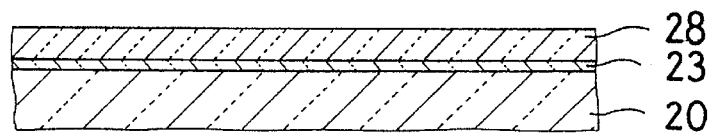
FIGS. 10A–10F are sketches for explaining the process of manufacturing the liquid crystal display element shown in FIG. 7.
Figure 10B:
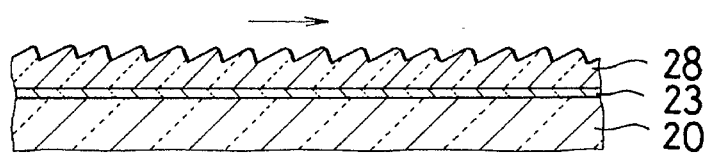
Figure 10C:
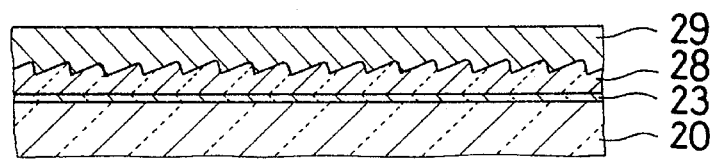
Figure 10D:
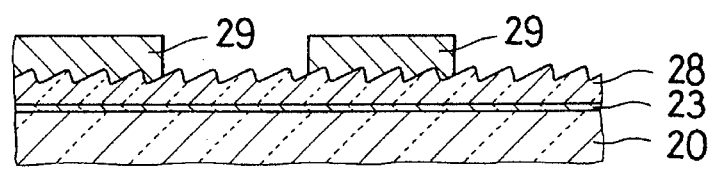
Figure 10E:
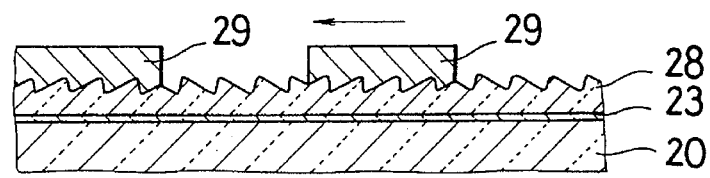
Figure 10F:
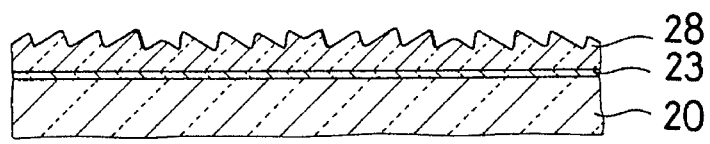

As shown in FIG. 9 it is preset that a pretilt angle $AP_1$, which is given to liquid crystal molecules LC by orienting film 25, is larger than a pretilt angle $AP_2$, which is given to the molecules LC by orienting film 26.

As the result of this, in the orienting domain DMa liquid crystal molecules form in a counterclockwise spiral twisted by 90° such that at the bottom of the liquid crystal layer (the side of orienting film 25) the molecule points to the right (the direction of 0°) and at the top of the layer (the side of orienting film 26) it points downward (the direction of 270°). Also, in orienting domain DMb liquid crystal molecules LC form in a counterclockwise spiral twisted by 90° such that at the bottom of the layer the molecule points to the left (the direction of 180°) and at the top of the layer it points upward (the direction of 90°).

Thus, in accordance with the embodiment of the TN-type liquid crystal cell the liquid crystal molecules LC of the liquid crystal material 22 sealed between the substrates 20, 21 can be oriented in any desired direction by rubbing the orienting films 25, 26 such that regarding the respective orienting domains DMa and DMb, orienting film 25, with which substrate 20 is coated, is rubbed in respective directions that are different from each other by 180°, and orienting film 26, with which substrate 21 is coated, is rubbed in one direction that is perpendicular to the direction in which orienting film 25 is rubbed.

It has been experimentally confirmed that even when the whole orienting film 26 is rubbed in the same direction, the orientation of liquid crystal molecules LC, which constitute each of the two orienting domains DMa and DMb, can be adequately controlled.

FIGS. 10A–10F show the manufacturing process of forming the orienting film 20 on the substrate 20 as follows:

1. The substrate 20, on which a transparent electrode 23 is formed, is coated with a polyimide resin 28 of a given thickness used as the orienting film 25 (see FIG. 10A).

2. The coated polyimide resin 28 is rubbed from its left end in the rightward direction (the direction of 0°), which corresponds to the orienting domain DMa (see FIG. 10B).
3. All the polyimide resin 28 is coated with a photoresist material 29 (see FIG. 10C).
4. The photoresist material 29 is masked with a mask pattern for providing the orienting domain DMb, and then the masked material is exposed to light to expose only the part of the orienting domain DMb (see FIG. 10D).
5. The exposed domain is rubbed from its right end in the leftward direction (the direction of 180°), which corresponds to the domain DMb (see FIG. 10E).
6. The remaining photoresist material 29 is removed (see FIG. 10F).

On the other hand, when the orienting film 26 is formed on the substrate 21, only the following two processes are needed:

1. The substrate 21, on which the transparent electrode 24 is formed, is coated with a polyimide resin of a given thickness, which is used for the orienting film 26.
2. All the polyimide resin is rubbed in the direction of 90°.

Thus, in this embodiment, the number of steps in the process of forming the orienting films 25, 26 on the substrates 20, 21 can be sharply reduced when a TN-type liquid crystal cell with a small dependency on the optic angle is produced. As a result, the cost of manufacturing a complementary-type TN liquid crystal cell can be greatly reduced.

Figure 11:
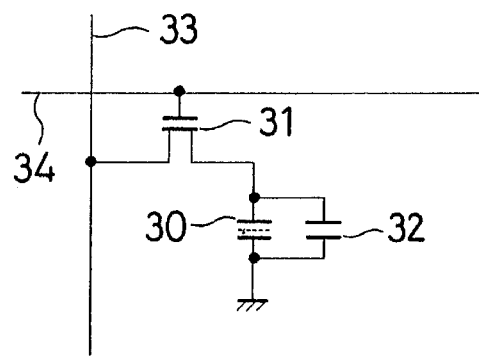
FIG. 11 is a circuit diagram showing an electrically equivalent circuit of a liquid crystal display element.

Regarding one pixel, an equivalent circuit of the complementary-type TN liquid crystal display cell is as one shown in FIG. 11. In it the complementary-type cell that corresponds to one pixel consists of a liquid crystal cell 30, defined by the transparent electrodes 23, 24, and a switching transistor 31. A capacitor 32 is connected in parallel to the cell 30 so that a voltage can be applied to it for a needed period.

Further, a signal on the scanning signal line 33 is added to the gate of the switching transistor 31, and a signal on the data line 34 is added to the source of the transistor 31.

In the complementary-type TN liquid crystal display cell, when a voltage is applied to the substrates 20, 21, the cell is changed into a dark state. In this state there is a possibility that light leaks from around the boundary line BL, which borders orienting domains DMa and DMb. Such a leakage from the boundary line BL causes an increase in transmittance in the dark state. This results in a disadvantage, namely, deterioration of the contrast of the cell.

As to the cause of the leakage of light, it is thought that when liquid crystal molecules LC are in changed positions due to an applied voltage, the liquid crystal material 22 is in a discontinuous state between orienting domains DMa and DMb so that a phenomenon similar to a crystalline defect is formed at the boundary line BL.

Hence, in the complementary-type cell a light-shading film is provided on the substrate 21 side as a means to prevent leakage of light to shade the portion at the boundary line BL.

Figure 12:
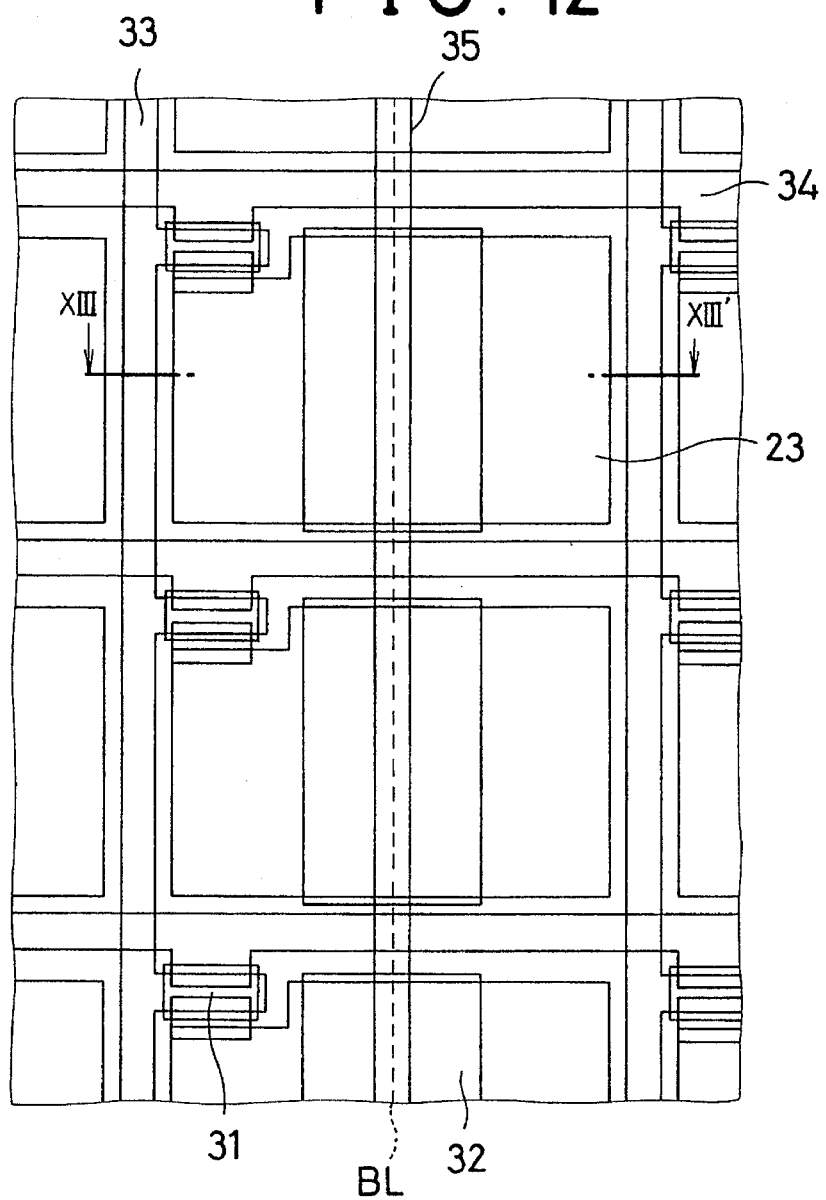
FIGS. 12 and 13 are a schematic plan view and a partial cross-sectional view
Figure 13:
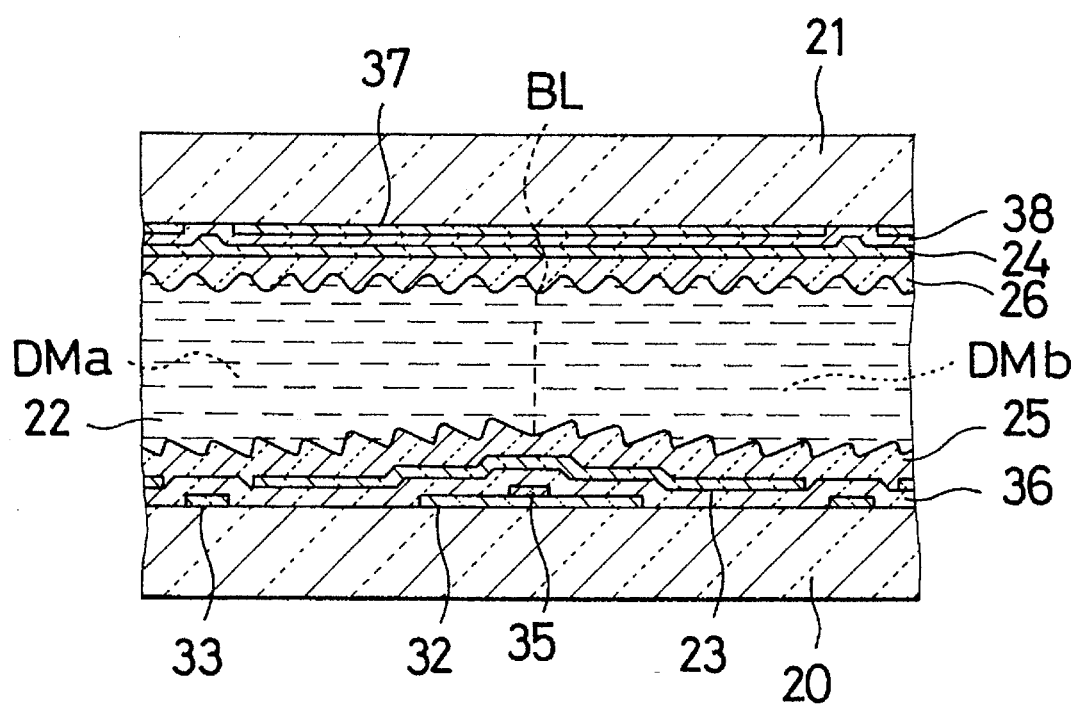

As shown in FIGS. 12 and 13, the capacitor line 35 that connects a capacitor is disposed just below the boundary line BL. This capacitor line 35 also serves as a shading film to shade leakage light.

The capacitor 32, the capacitor line 35, and the scanning signal line 33 are insulated by an insulating layer 36 from transparent electrode 23. A color filter 37 that is formed directly on substrate 21 is used as a color-generating means for color display. A protective layer 38 is provided between transparent electrode 24 and the color filter 37.

In this case, the switching transistor 31 is constituted by a thin-film transistor consisting of an active element and amorphous silicon. A thin film of chromium is used as a material of the scanning signal line 33, the data signal line 34, and the capacitor line 35.

The transparent electrodes 23, 24 are formed by a sputtering method by using ITO (indium tin oxide), a material used for a transparent electrode. The capacitor 32 is also formed by the sputtering method using ITO. It is formed into a size of 82 μm long and 50 μm broad by a photolithography process. The color filter 37 is formed into an array-like shape by a dyeing method, and the protective layer 38 is formed by silica.

Thus, in this embodiment the cost of manufacturing the complementary-type cell can be reduced in that the capacitor line 35, which is also used as a light-shading film to prevent light from being leaked from the boundary line BL, eliminates the necessity of providing a separate light-shading film.

Figure 14:
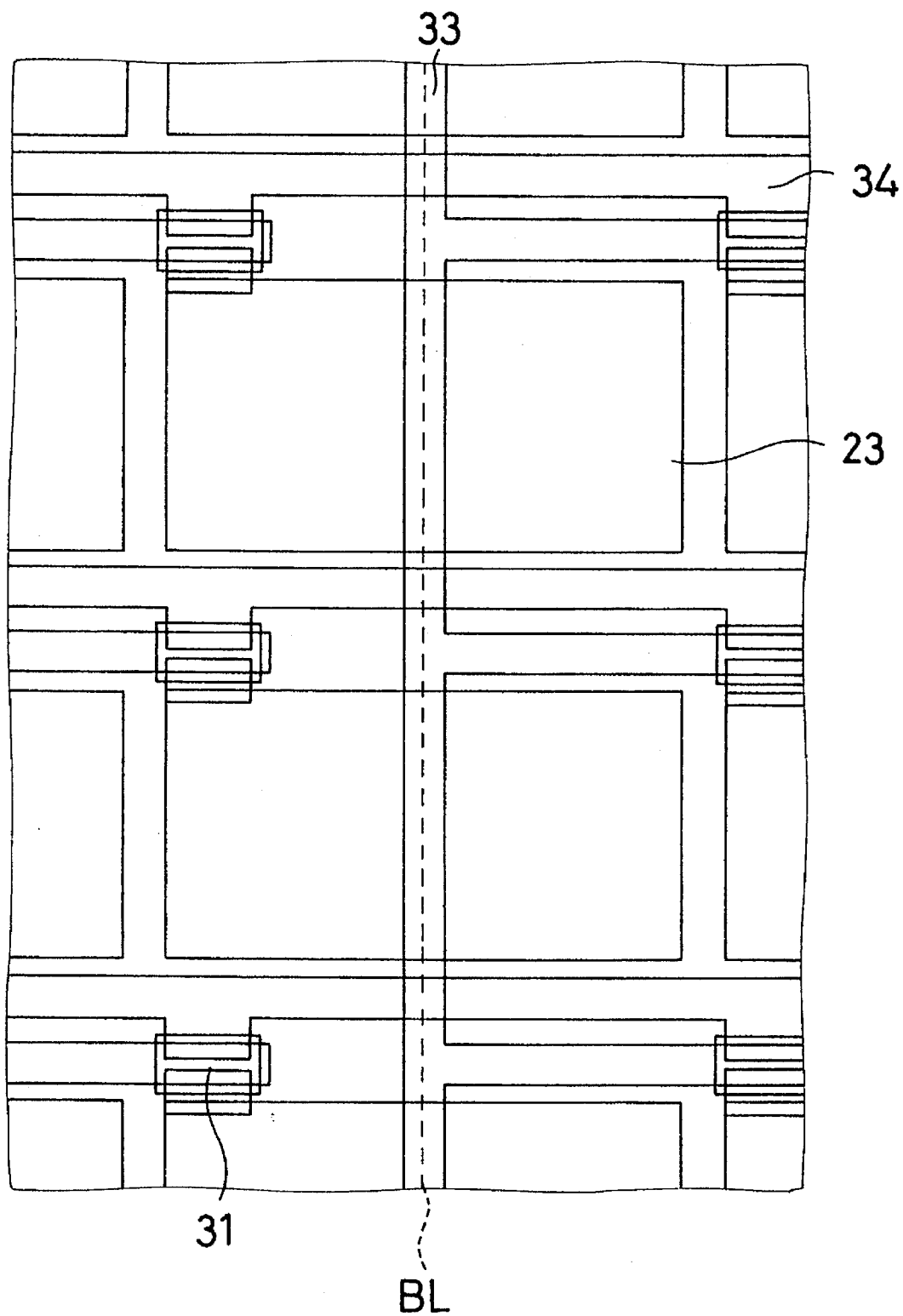
FIG. 14 is a schematic plan view showing a modification of the embodiment shown in FIG. 12.

Although in the embodiment shown in FIG. 12 the capacitor line 35 is used as a light-shading film to shade the light leaking from the boundary line BL, the scanning line 33 also serves as a light-shading film, as shown in FIG. 14.

In FIG. 14 the same symbols and legend are used for the same corresponding parts and counter parts as those shown in FIG. 12.

As mentioned above, the fact that in the complementary-type cell the orienting films 25, 26 are rubbed in different directions to differ the directions of orientation in the orienting domains DMa, DMb causes a phenomenon called a disclination (discontinuous part in the liquid crystal material 22).

The effect of the disclination can be suppressed if the position where it is formed is foreseeable, as that formed at the boundary line BL in the orienting domains DMa, DMb. However, it is difficult to address the phenomenon if the position is not foreseeable and changeable. When the position of the disclination is changeable, an afterimage is large, and an image displayed is indistinct.

There are also some problems in which the rate of leakage light increases, and the contrast decreases sharply when a disclination is formed around the pixel to surround it.

Figure 15:
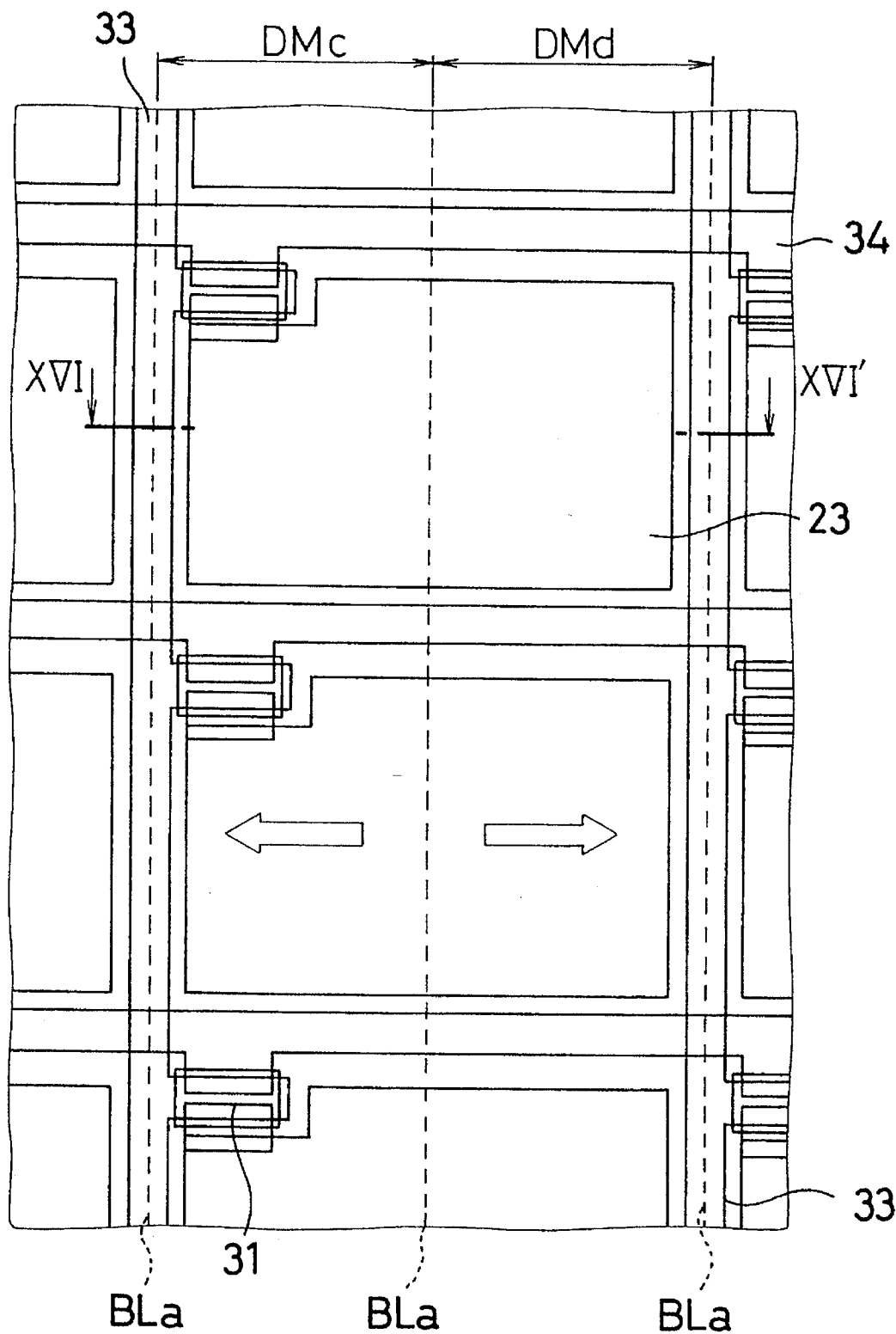
FIGS. 15 and 16 are a schematic plan view and a schematic cross-sectional view showing still another embodiment of this invention.
Figure 16:
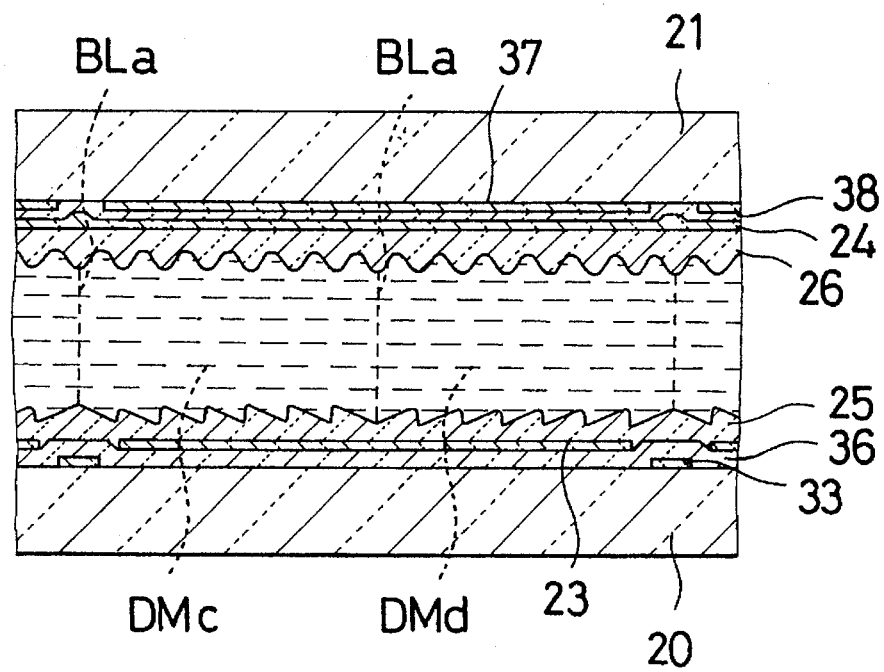

To solve the problem the inventors of this invention constituted an embodiment shown in FIGS. 15 and 16. In this embodiment orienting domains DMc and DMd are defined to form boundary lines BLa both at the center of one pixel and at the boundary with adjacent pixels. The orienting domain DMc is rubbed from the boundary line BLa toward the scanning line 33 (the direction of 180°), and the orienting domain DMd is rubbed from the same boundary line BLa toward the scanning line 33 (the direction of 0°).

Figure 17:
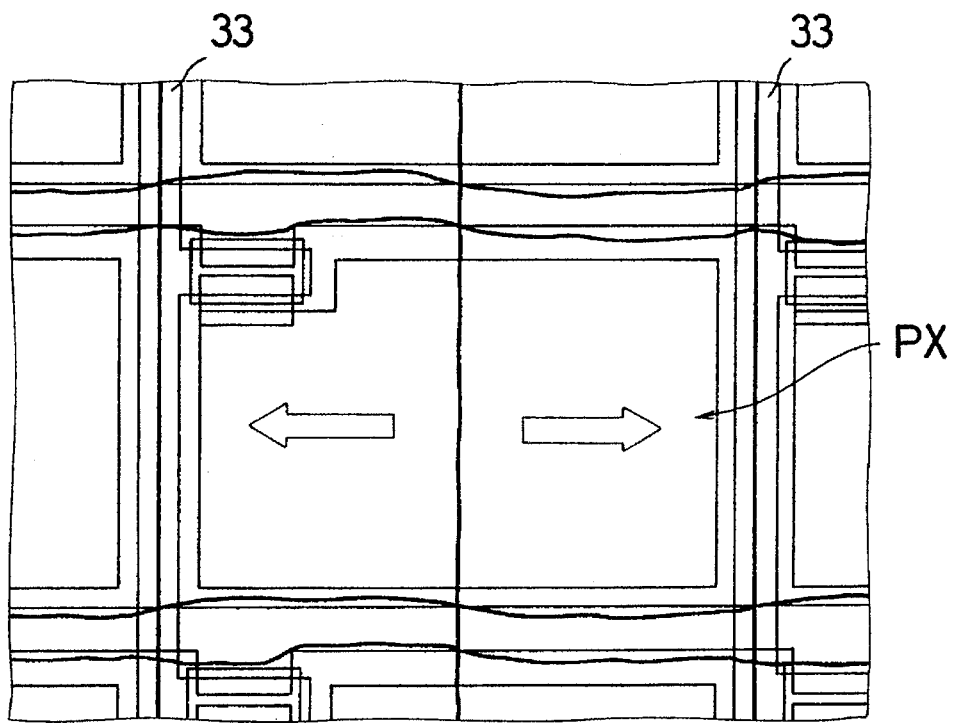
FIG. 17 is a schematic plan view for explaining the effect of the embodiment shown in FIGS. 15 and 16.

In FIGS. 16 and 17 the same symbols and legend are used for the same corresponding parts and counterparts as those shown in FIGS. 12 and 13.

In this embodiment a disclination is generated when a voltage is applied across the substrates 20, 21, as shown by the dick line in FIG. 17. In this case, as the disclination formed at the center of each pixel PX in the vertical direction has a narrow width of 2–3 μm, the rate of light leaking from it is small, and the contrast increases. Further, as the position where the disclination is formed is fixed, an afterimage can be suppressed, and an image easy to see can be obtained.

Figure 18:
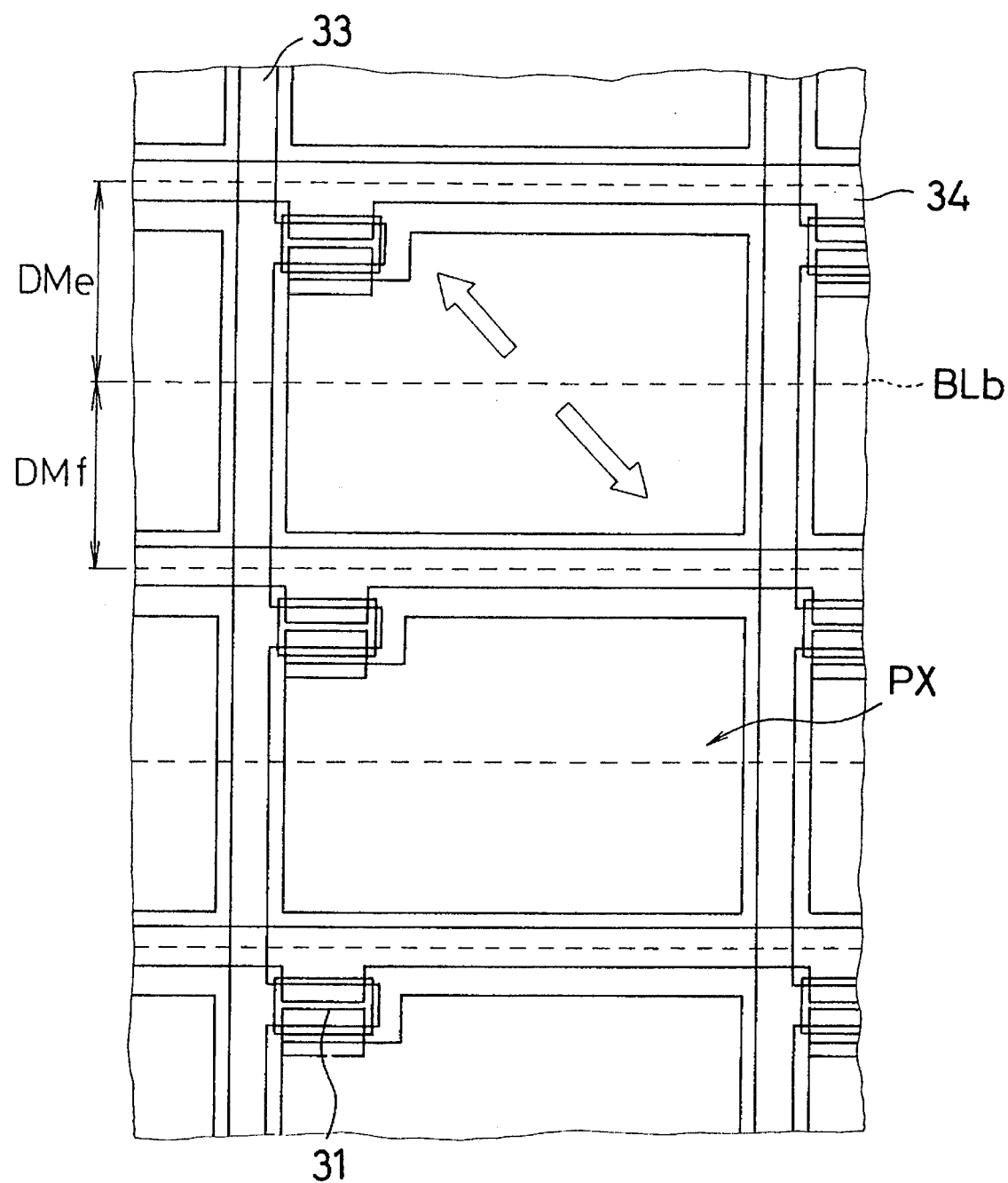
FIG. 18 is a schematic plan view for explaining a modification of the embodiment shown in FIG. 15.

FIG. 18 shows a modification of the embodiment shown in FIGS. 16 and 17. In this case, a boundary line BLb that divides the domain of each pixel PX is formed in the horizontal direction (the direction of 180°), and orienting domains DMe and DMf are rubbed from the center of each pixel in directions of 135° and 315°, respectively.

Figure 19:
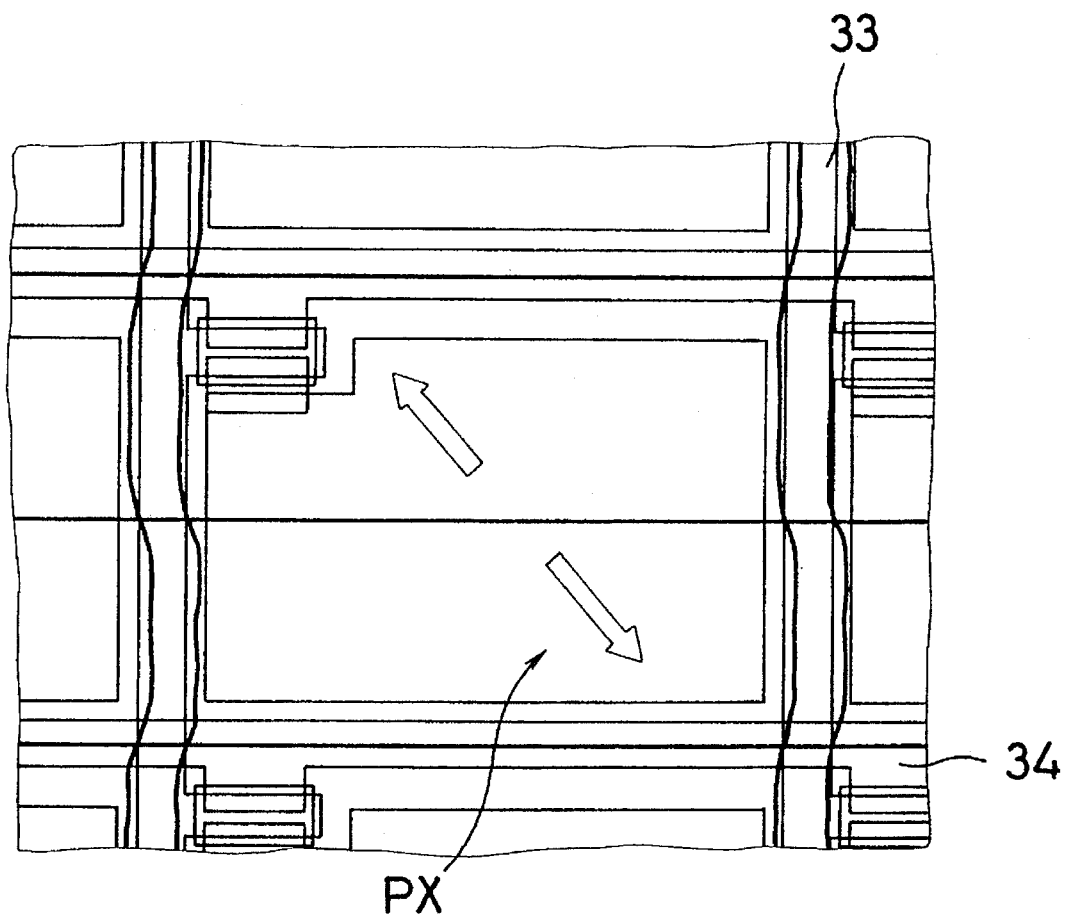
FIG. 19 is a schematic plan view for explaining the embodiment shown in FIG. 18.

In this case, as the disclination, which is generated when a voltage is applied across the substrates 20, 21 is, for example, as one shown by the dick line in FIG. 19, the contrast can increase similarly to the embodiment mentioned above.

Figure 20:
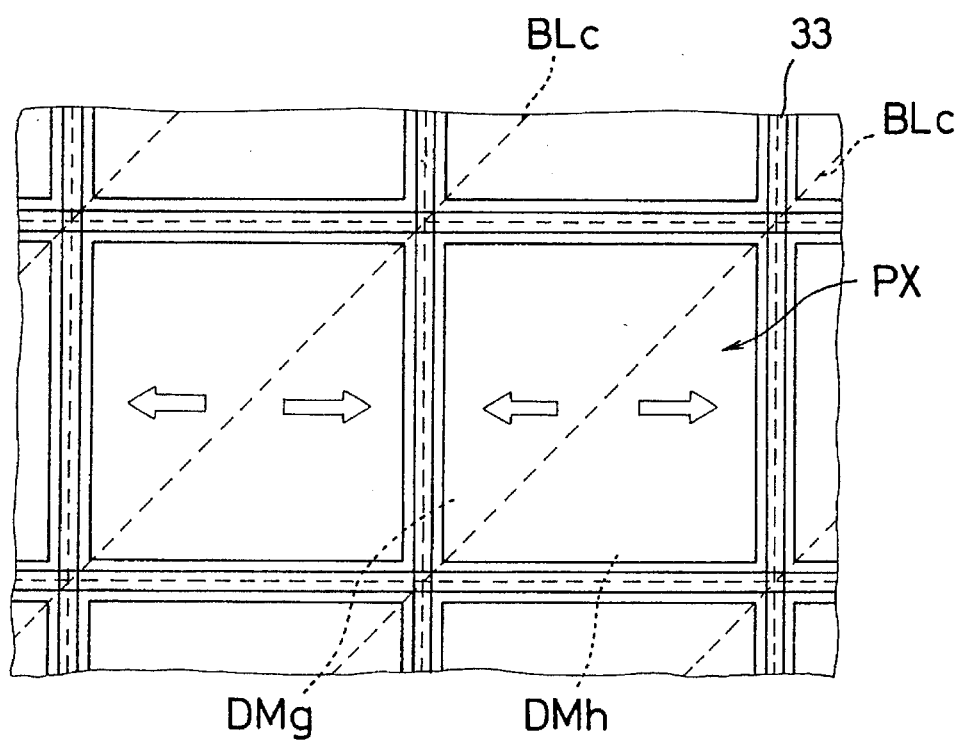
FIGS. 20 and 21 are schematic plan views showing other modifications of the embodiment shown in FIG. 15.
Figure 21:
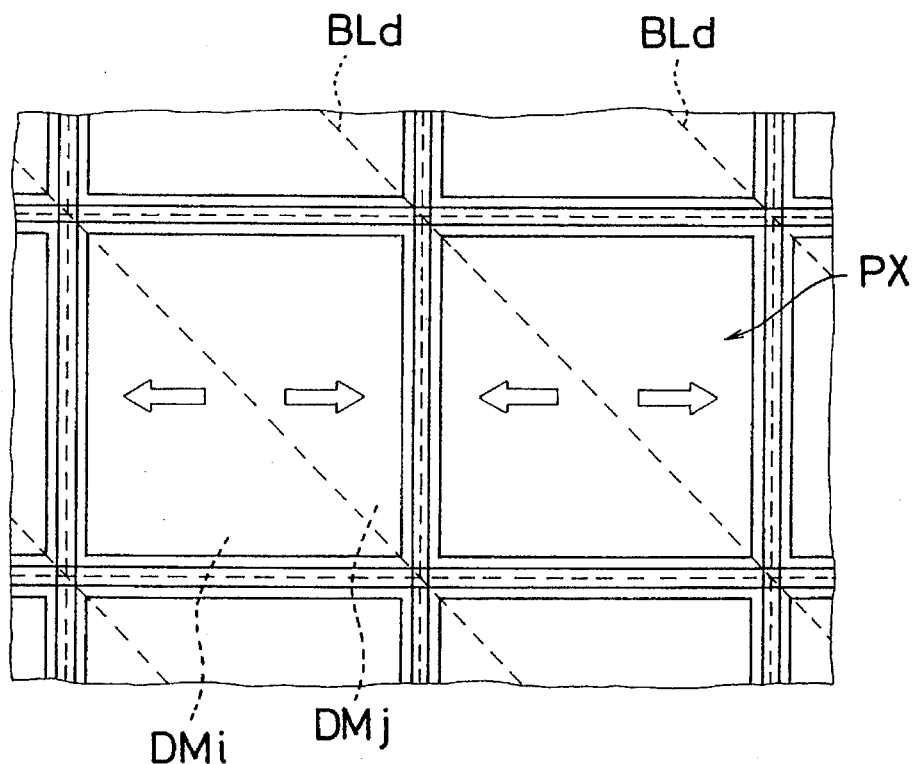

FIG. 20 shows still another modification of the embodiment shown in FIGS. 16 and 17. In this case, a boundary line BLc that divides the domain of each pixel is formed in a direction (45°) of the diagonal of the pixel PX, and orienting domains DMg and DMh are rubbed from the boundary line BLc in the directions of 90° and 0°, respectively.

When the direction of the spiraling of the liquid crystal material 22 is clockwise, it is advisable that a boundary line BLd that divides the domain of each pixel PX is formed in the direction (135°) of the diagonal of the pixel, and that orienting domains DMi and DMj are rubbed from the center of the pixel in the directions of 90° and 0°, respectively.

Although in the above-mentioned embodiments orienting domains common to a plurality of pixels are formed, the kind of the orienting domain can be changed according to the unit of the pixel PX, as shown in FIGS. 22A and 22B. In this case, one display unit is constituted from two adjacent pixels PX, each of which has different kinds of domains A, B.

FIGS. 23A–23C show some cases in which this embodiment is used in a color liquid crystal display apparatus. In FIGS. 23A, 23B, and 23C color filters R, G, and B are disposed in the so-called striped arrangement, diagonal arrangement, and triangular arrangement, respectively. In the arrangement the orienting domains A and B are disposed by turns in both the vertical and horizontal directions.

FIGS. 24A–24C show other cases in which the embodiment is used in a color liquid crystal display apparatus. In FIGS. 24A, 24B, and 24C color filters R, G, and B are disposed in the modified so-called striped arrangement, diagonal arrangement, and triangular arrangement, respectively. In the modified arrangement the orienting domains A and B are disposed by turns in the vertical direction, and two of each of the domains A and B are disposed by turns in the horizontal direction.

Figure 25A:
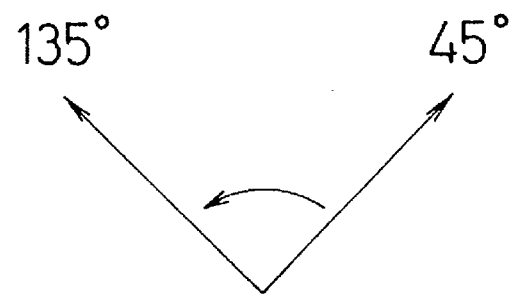
FIGS. 25A and 25B are sketches for explaining modifications of the direction of rubbing.
Figure 25B:
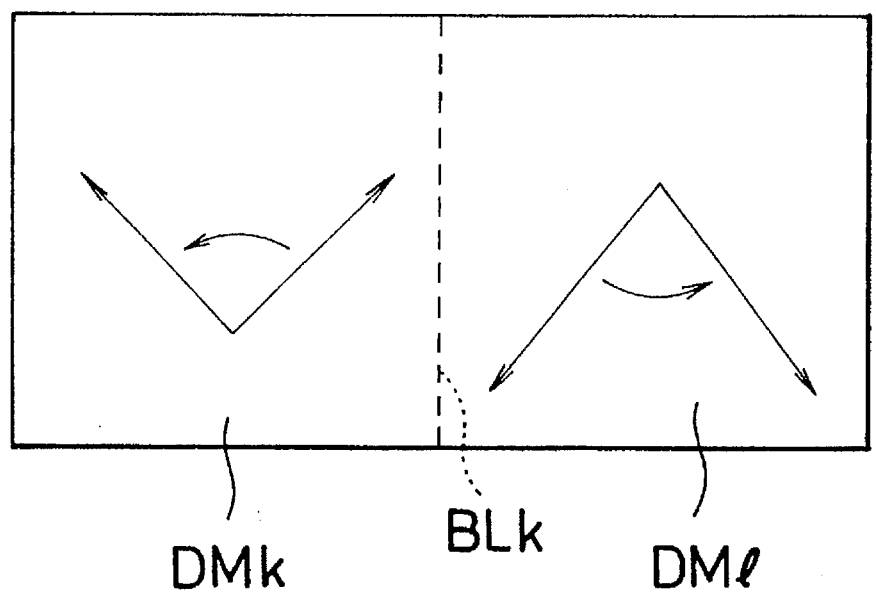

Although in each of the above-mentioned embodiments the orienting films 25, 26 are rubbed in the directions of 180° and 0°, this invention can be applied to a case in which the orienting film is rubbed in directions of 45° and 135° as shown by arrows in FIG. 25a. In this case, for example, the directions of rubbing in adjacent orienting domains are as shown by arrows in FIG. 25B. In it orienting domains DMk and DMl are divided by a boundary line BLk.

We claim:

1. A liquid crystal display element comprising a layer of liquid crystal material including a first layer of liquid crystal molecules adjacent to a first substrate between a second layer of liquid crystal molecules adjacent to a second substrate, wherein:

the first and second layers of liquid crystal molecules are each divided into a multiplicity of display units;

each of the display units associated with the first layer of liquid crystal molecules is further divided into a multiplicity of domains;

the first layer liquid crystal molecules in each of the domains have an active molecular orientation common to said respective domain, the active molecular orientations in two adjacent domains differing from each other by 180 degrees;

each of the display units associated with the second layer liquid crystal molecules has a third active molecular orientation approximately perpendicular to said active molecular orientations in two adjacent domains differing from each other by 180 degrees, wherein said second layer liquid crystal molecules corresponding to one of said two adjacent domains have a substantially identical orientation as said second layer liquid crystal molecules corresponding to another of said two adjacent domains; and the first and second layers of liquid crystal molecules have first and second pre-tilt angles, respectively, the first pre-tilt angle being greater than the second pre-tilt angle.

2. The liquid crystal display element of claim 1, in which said first and second active molecular orientations of said liquid crystal molecules in said domains of said first layer are perpendicular to boundary lines of said domains.

3. The liquid crystal display element of claim 1, additionally comprising capacitance means, disposed along boundaries dividing said domains from one another, for holding a voltage across said liquid crystal molecules, wherein said voltage is sufficient for activation of said liquid crystal molecules.

4. The liquid crystal display element of claim 1, additionally comprising an electrode disposed along boundaries dividing said domains from one another.

5. A liquid crystal display element comprising a layer of liquid crystal material including a first layer of liquid crystal molecules adjacent to a first substrate and a second layer of liquid crystal molecules adjacent to a second substrate wherein:

the first and second layers of liquid crystal molecules are each divided into a multiplicity of display units;

each of the display units is further divided into a first pixel and a second pixel;

the first layer liquid crystal molecules in said first pixel of each display unit have a first pre-tilt angle and a first active molecular orientation, and the first layer liquid crystal molecules in said second pixel of each display unit have the first pre-tilt angle and a second active molecular orientation differing from the first active molecular orientation by 180 degrees;

the second layer liquid crystal molecules have a second pre-tilt angle and a third active molecular orientation approximately perpendicular to the first and second active molecular orientations, wherein said second layer liquid crystal molecules corresponding to said first pixel has a substantially identical orientation as said second layer liquid crystal molecules corresponding to said second pixel; and the first pre-tilt angle is greater than the second pre-tilt angle.

6. The liquid crystal display element of claim 5, additionally comprising capacitance means, disposed along boundaries providing said domains from another, for holding a voltage across said liquid crystal molecules, wherein said voltage is sufficient for activation of said liquid crystal molecules.

7. The liquid crystal display element of claim 5, additionally comprising an electrode disposed along boundaries dividing said domains from one another.

8. The liquid crystal display element of claim 5, in which a plurality of pixels within a pixel set are each covered with a predetermined pattern of color filters, said pixel set consisting of said plurality of said first pixels and said plurality of said second pixels.

9. A liquid crystal display element comprising a layer of liquid crystal material including a first layer of liquid crystal molecules adjacent to a first substrate and a second layer of liquid crystal molecules adjacent to a second substrate, wherein:

the first and second layer liquid crystal molecules are each divided into a multiplicity of display units;

each of the display units is further divided into a multiplicity of domains such that the first layer liquid crystal molecules in two neighboring said domains have active molecular orientations differing from each other by 180 degrees;

the second layer liquid crystal molecules have a single active molecular orientation approximately perpendicular to the active molecular orientations of the first layer, wherein said second layer liquid crystal molecules corresponding to one of said two neighboring said domains have a substantially identical orientation as said second layer liquid crystal molecules corresponding to another of said two neighboring said domains; and said liquid crystal molecules of said first layer have pre-tilt angles greater than the pre-tilt angles of said liquid crystal molecules of said second layer liquid crystal molecules.

10. The liquid crystal display element of claim 9, wherein said active molecular orientations of the liquid crystals in said neighboring domains of said first layer are perpendicular to the boundary of said neighboring domains.

11. The liquid crystal display element of claim 9, further comprising capacitance means, disposed along boundaries of said neighboring domains, for holding a voltage across said liquid crystal molecules, wherein said voltage is sufficient for activation of said liquid crystal molecules.

12. The liquid crystal display element of claim 9, further comprising an electrode along the boundaries of said neighboring domains.

13. A liquid crystal display element comprising a layer of liquid crystal material including a first layer of liquid crystal molecules adjacent to a first substrate and a second layer of liquid crystal molecules adjacent to a second substrate, wherein:

the liquid crystal material is divided into repetitively arranged display units each comprising two adjacent pixels;

the first layer liquid crystal molecules in one of the two adjacent pixels have active molecular orientations differing by 180 degrees from the active molecular orientations of the first layer liquid crystal molecules in the other of the two adjacent pixels;

the second layer liquid crystal molecules corresponding to one of said two adjacent pixels have a substantially identical orientation as said second layer liquid crystal molecules corresponding to another of said two adjacent pixels; and the first and second layer liquid crystal molecules have first and second pre-tilt angles, respectively, with the first pre-tilt angle being greater than the second pre-tilt angle.

14. A liquid crystal display element comprising a layer of liquid crystal material including a first layer of liquid crystal molecules adjacent to a first substrate a second layer of liquid crystal molecules adjacent to a second substrate, wherein:

the liquid crystal material is divided into repetitively arranged display units, each said display unit having two pixels covered with a pre-determined pattern of multiple colored filters;

the first layer liquid crystal molecules in one of the two pixels have opposite molecular orientations from the active molecular orientations of the first layer liquid crystal molecules in the other of the two pixels;

the second layer liquid crystal molecules have an active molecular orientation perpendicular to the active orientations of the first layer liquid crystal molecules, wherein said second layer liquid crystal molecules corresponding to one of the two pixels have a substantially identical orientation as said second layer liquid crystal molecules corresponding to another of the two pixels; and the first and second layer liquid crystal molecules have first and second pre-tilt angles, respectively, the first pre-tilt angles being greater than the second pre-tilt angles.

* * * * *